United States Patent [19]

Gavioli

[11] 4,376,342
[45] Mar. 15, 1983

[54] THERMALLY INSULATING WALL STRUCTURE PARTICULARLY FOR KILNS

[76] Inventor: Gabriele Gavioli, Via Panigale, 6, Bologna, Italy

[21] Appl. No.: 192,263

[22] Filed: Sep. 30, 1980

[30] Foreign Application Priority Data

Oct. 8, 1979 [IT] Italy ................................ 4949/79[U]

[51] Int. Cl.³ ............................................. F26B 9/06
[52] U.S. Cl. ......................................... 34/86; 34/201; 34/235; 432/221
[58] Field of Search .................... 126/117; 110/180; 432/248, 26, 198, 176, 219–223; 34/86, 235, 201, 202

[56] References Cited

U.S. PATENT DOCUMENTS 3,198,503 8/1965 Eichelberg et al. ................ 432/198
4,244,686 1/1981 Scott, Jr. .............................. 432/26

Primary Examiner—Larry I. Schwartz
Attorney, Agent, or Firm—Guido Modiano; Albert Josif

[57] ABSTRACT

A thermally insulating wall comprises an air-permeable thermally insulating material layer and two panels co-operating therewith to define internal and external interstices, communicating with the space to be insulated. A blower is furthermore provided effective to draw air from the outside and deliver the drawn air into the external interstice through a throttling valve.

1 Claim, 2 Drawing Figures

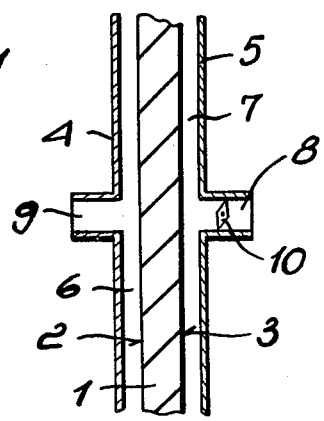
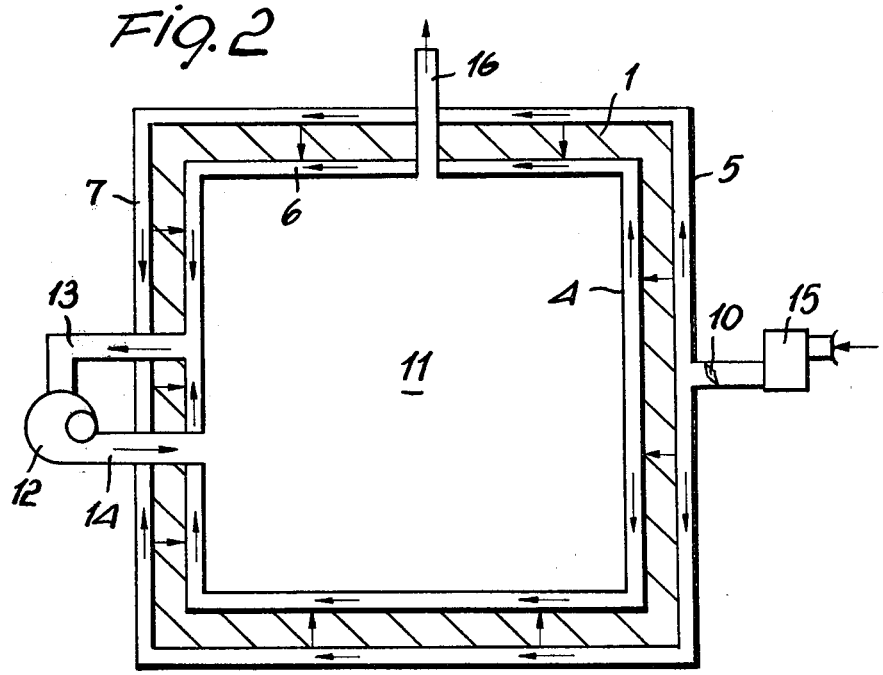

THERMALLY INSULATING WALL STRUCTURE PARTICULARLY FOR KILNS

BACKGROUND OF THE INVENTION

This invention relates to a thermally insulating wall structure particularly useful in the construction of ceramics kilns.

It is a well known fact that in order to reduce heat losses from an enclosed space, either the wall thickness or type of the thermal insulating material are to be suitably adjusted. However, it inevitably occurs that such losses can only be reduced, while the cost of the wall structure is increased, which poses economical limitations not to be exceed.

SUMMARY OF THE INVENTION

This invention sets out to obviate such limitations by providing a wall which allows the recovery and re-utilization of the heat dissipated through the wall itself.

According to one aspect of the present invention, there is provided a thermally insulating wall structure, characterized in that it comprises a layer of an air-permeable thermally insulating material, two panels defining, in cooperation with the opposed faces of said layer, internal and external interstices with respect to the space to be insulated, said interstices being in communication with said space and the outside, respectively, and a blower effective to establish a flow of air from the outside into said space, through said interstices and air-permeable layer, as well as a throttling valve for the air intake.

BRIEF DESCRIPTION OF THE DRAWING

Further features of the invention will be more clearly understood from the following detailed description, with reference to the accompanying drawing, where:

FIG. 1 is a sectional view of one portion of the thermally insulating wall structure according to this invention; and FIG. 2 is a plan view of a kiln incorporating the wall of FIG. 1.

DESCRIPTION OF THE PREFERRED EMBODIMENTS

With reference to FIG. 1, the thermally insulating wall of this invention comprises a layer 1 of a porous, air-permeable thermally insulating material which offers little resistance to the air flow. That material will suitably be of the fibrous or laminar types.

At a determined distance from the opposite faces 2,3 of the layer, panels 4,5 are provided which are made of a material impervious to air and define air conveyance chambers of interstices 6,7 provided with one or more air intake and exhaust mouths 8,9. The mouth 8 accommodates a throttle valve 10 of the butterfly type, for adjusting the flow rate of the air admitted therethrough. If, for example, the specific thermal conductance of the layer 1 is 1 kcal/hour per square meter, and at a differential of one degree temperature between the inside and outside of the interior to be insulated, then the air flow rate from the outside to the inside is of about 4 kg/hour per square meter and independent of the temperature differential across the two faces of the thermal insulating layer. The average air flow velocity through the thermal insulating layer will accordingly be of about 1 mm/sec in a perpendicular direction to the faces of the thermal insulating material.

FIG. 2 illustrates diagramatically the application of the wall of FIG. 1 to a kiln or furnace 11 maintained at a high temperature by the direct introduction of flue gases having a combustion temperature which exceeds that required by the kiln.

For heating the kiln, a burner 12 is provided which takes in air from the internal interstice 6 through an intake conduit 13, and delivers it to the kiln inside through a delivery conduit 14. The air reaches the interstice 6 through the porous layer 1, from the interstice 7 whereinto it has been introduced by a blower 15 through the mouth 8, and leaves the kiln through an exhaust conduit 16.

The air picked up from the outside is, at the mouth 8, at a pressure level such as to overcome the load drop due to circulation, in the direction of the arrows in FIG. 2, through the external interstice 7, to diffusion through the layer 1, and to circulation through the internal interstice 6.

By suitably manipulating the valve 10, it becomes possible to adjust the air pressure at the intake of the burner 12 such that the air/fuel ratio, in combination with the heating of the air resulting from leakage through the layer 1, enables the kiln efficiency to be optimized. In particular, by providing pre-heating of the air to nearly the kiln temperature, and using the same air/fuel ratio as is employed in current practice, higher temperatures can be reached in the conduit 14, and accordingly, for a given amount of heat delivered with the flue gases, appreciably smaller volumes of fumes can be released.

By way of example, if the temperature in the kiln 1 is 1000° C., and assuming that through the walls and fumes 30% and 40%, respectively, of the input heat, is dissipated in current practice, then, with the wall according to this invention a temperature level close to 990° C. can be achieved, with savings up to 99% in the amount of heat allowed through the walls, which means that, allowing for the decrease in the fume volumes, it is possible to spare up to 45% of fuel.

What is claimed is:

1. A wall structure for thermally insulating an enclosed space to be heated such as a ceramic kiln, said enclosed space being defined by four side panels and top and bottom panels, said wall structure comprising a a layer of an air-permeable thermally insulating material located adjacent to and coextensive with, but spaced from the exterior surface of at least one of said panels, to define an internal chamber, and an external chamber formed by a panel located adjacent to and coextensive with said insulating material on the opposite side of said insulating material from said internal chamber, means to enclose said internal and external chambers such that air flow therethrough is restricted to passage through said insulating material, said external chamber having at least one air intake mouth and said internal chamber having at least one air exhaust mouth leading to said enclosed space, air supplying means effective to create an air flow from said intake mouth to said exhaust mouth, whereby said air passes from said external chamber, through said air-permeable thermally insulating material wherein said air is heated and thereafter passes into said internal chamber and into said enclosed space.

* * * * *